Sept. 13, 1960  W. S. SUPROWICH  2,952,365
TOBACCO LEAF DRYING FRAME AND RACKS THEREFOR
Filed April 1, 1957  2 Sheets-Sheet 1

INVENTOR:
WASYL S. SUPROWICH.
HIS ATTYS

Sept. 13, 1960   W. S. SUPROWICH   2,952,365
TOBACCO LEAF DRYING FRAME AND RACKS THEREFOR
Filed April 1, 1957   2 Sheets-Sheet 2
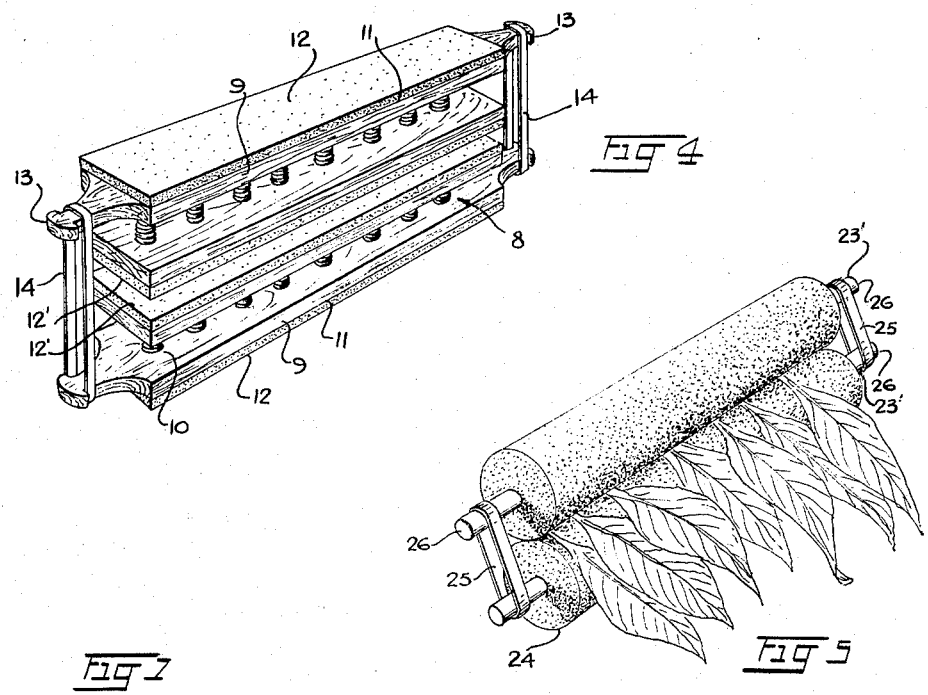
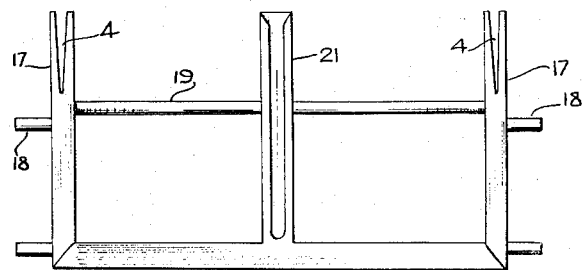
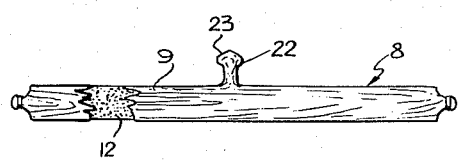
INVENTOR:
WASYL S. SUPROWICH

United States Patent Office 2,952,365
Patented Sept. 13, 1960

2,952,365

TOBACCO LEAF DRYING FRAME AND RACKS THEREFOR

Wasyl S. Suprowich, General Delivery, Gardenton, Manitoba, Canada

Filed Apr. 1, 1957, Ser. No. 649,868

2 Claims. (Cl. 211—86)

My invention relates to new and useful improvements in tobacco leaf drying frames and racks therefor, whereby the tobacco leaves may be racked for the curing process prior to further treatment in order to transfer the leaves into the required condition for further processing.

The conventional method is for highly skilled workers to grasp a bunch of leaves, bevel the stem ends, secure the stem ends by several twists of string or twine and then spread the leaves and place them over a stick so that they hang from the tied stem ends. The sticks are then racked in curing houses whereupon they are removed from the sticks, the twine cut and removed, and the leaves then are ready for further processing.

It will be appreciated that this is not only a time-consuming operation requiring skilled workers in order to obtain the best possible speed, but that considerable amounts of string and twine are used and this string and twine is difficult to remove from the cured bunches of leaves. Furthermore, the use of string tends to bruise the stems thus lowering the grade of the leaf.

I have overcome these disadvantages by providing an open rectangular drying frame and leaf carrying racks between which the stems may readily be placed. The racks are then placed within the frames and secured readily and easily, not only saving a considerable amount of time and material, but enabling relatively unskilled labor to be employed. After curing, the leaves are readily removed from the racks without damage occurring thereto and inasmuch as the racks are covered with resilient material, crushing of the stems is prevented.

The principal object of the invention may, therefore be stated to be the provision of a tobacco leaf drying frame adapted to receive a plurality of racks between which bunches of tobacco leaves may readily and easily be held without damage occurring.

A further object of the invention is to provide a device of the character herewithin described which enables the racks to be used in conventional curing sheds without alteration thereto.

A further object of the invention is to provide a device of the character herewithin described which is adapted to be provided with rollers upon the sides of the frame thus facilitating the mounting of these frames within the curing shed and enabling the frame to be moved along the runners provided to carry the frame.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 4 is a perspective view of a pair of the carrying racks.

Figure 5 is a perspective view of an alternative embodiment of a pair of these carrying racks showing leaves held therebetween.

Figure 6 is a top plan view of yet another embodiment of a leaf carrying rack.

Figure 7 is a view of an alternative embodiment of a leaf-carrying frame suitable for use with the racks shown in Figure 6.

Figure 8 is an enlarged perspective fragmentary view of one end of an alternative embodiment of a leaf carrying rack.

In the drawings like characters of reference indicate corresponding parts in the different figures.

Figure 1:
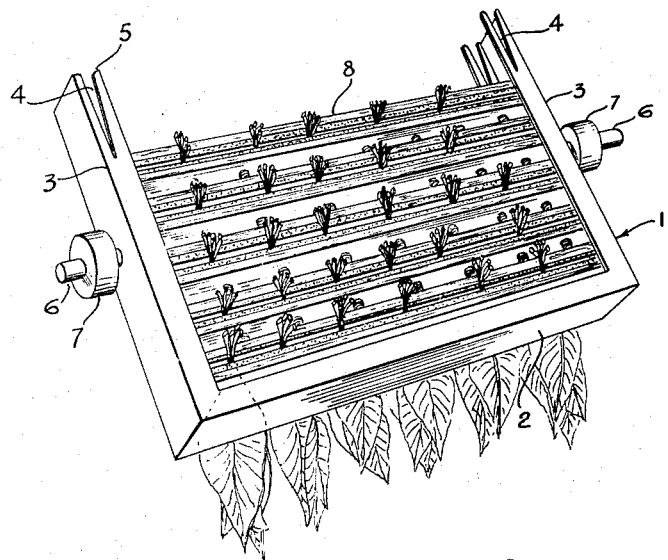
Figure 1 is a perspective view of one embodiment of my frame shown loaded with a plurality of racks carrying bunches of tobacco leaves.
Figure 2:
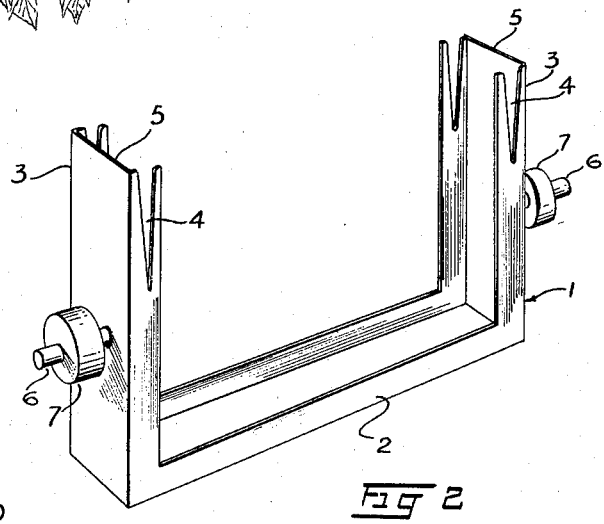
Figure 2 is a perspective view of this tobacco leaf frame per se.

Proceeding now to describe my invention in detail, it will be seen from the accompanying drawings that I have illustrated in Figures 1 and 2 a leaf drying frame collectively designated 1 comprising a base member 2 and a pair of upstanding side members 3 thus forming an open rectangular frame. The side members 3 are manufactured from open channels facing inwardly as illustrated in Figure 2 and notches 4 are formed upon the upper ends 5 of these side members, the purpose of which will hereinafter become apparent.

Spindles 6 extend outwardly from the side members 3 and are provided with rollers 7 adjacent the inboard ends thereof. These spindles 6 permit the loaded frame to be handled by the operators, and to be elevated, if necessary, on a conventional conveyor (not illustrated). The rollers 7 permit the loaded frame to be moved easily along horizontal and parallel supports normally found within conventional curing sheds (also not illustrated).

Tobacco leaf carrying racks such as those illustrated in Figures 4 and 8 are adapted to be carried by the frame 1 and dealing first with the racks shown in Figure 4, it will be seen that each rack collectively designated 8 consists of a pair of spaced and parallel boards or members 9 maintained in the desired relationship by a plurality of coil springs 10 extending therebetween. It will also be noted that the outer surfaces 11 of these boards 9 are covered with a resilient material 12 such as sponge rubber or plastic. If these racks shown in Figure 4 are to be utilized with frame 1 shown in Figure 2, then the width of the racks should be such that they will slide easily within the channels forming the sides 3 of the rack. However, if they are to be used with frames illustrated in Figures 3 and 7, then relatively short stub spindles 13 (Figure 4) are provided extending from the ends of the outermost boards 9.

In operation of the particular embodiment illustrated in Figure 4, the leaves are grasped by the operator and inserted between adjacent surfaces 12' of a pair of racks 8 whereupon the pair of racks are detachably secured together by means of a rubber band 14 or the like which spans adjacent spindles 13 or, if the racks are not provided with spindles, which spans the ends of the racks. A plurality of pairs of these racks are then placed within the frame 1 until same is substantially full as illustrated in Figure 1, whereupon resilient means such as a rubber band may be placed over the base 2 of the frame 1 and engaged within the aforementioned notches 4 so that a portion of the band spans these notches and engages the upper surface of the upper frame held within the racks. This, of course, holds all of the frames within the racks so that it is ready for transporting to the curing shed.

It will be appreciated that removal of the leaves after curing is relatively easy as it is merely necessary to remove the aforementioned rubber bands or equivalent thereof and the leaves fall out readily and without damage occurring.

Figure 3:
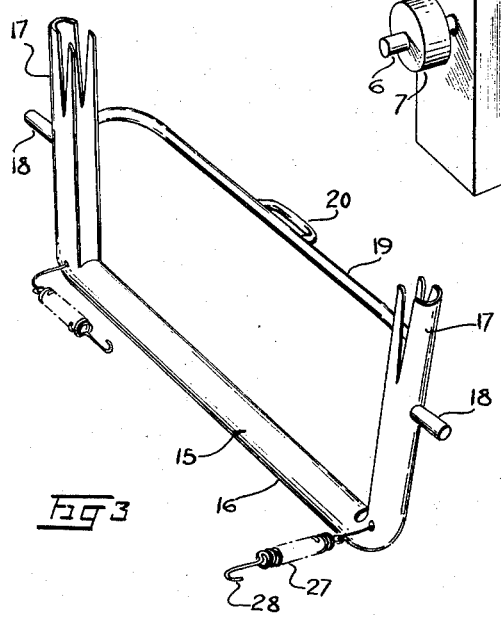
Figure 3 is a perspective view of an alternative embodiment of the carrying frame.

Turning next to a description of the frames illustrated in Figures 3 and 7, Figure 3 shows a frame collectively designated 15 consisting of a tubular base 16 and a pair of side frame members 17 extending upwardly from the ends thereof. These side frame members are also tubular with open sides thus being substantially semi-circular when viewed in cross-section. Stub spindles 18 extend outwardly from the side frame members 17 for the purpose described in the previous embodiment and a transverse offset brace member 19 is provided spanning the side frame members substantially medially along the length thereof with a carrying handle 20 formed thereon to facilitate handling of the loaded frames and to brace the side members against outward movement one from the other.

Figure 7 is similar in construction to the embodiment shown in Figure 3 and has been given similar reference characters where applicable. However, it is noted that a vertical slotted member 21 extends from the center of the base 16 upwardly and parallel with the side frame members 17, being held by the cross brace 19 substantially in the center thereof. In this embodiment it is desirable that the rack members be provided with an offstanding lug 22 extending from the side of the frame member, said lug having an enlargement 23 formed thereon and engageable within the slotted member 21. This gives additional support to a loaded frame and prevents the racks from flexing due to the weight of the leaves being carried thereby.

With the frames illustrated in Figures 3 and 7, it is desirable that the racks shown in Figure 5 be utilized. These racks consist of a central spindle 23′ covered with resilient material 24 such as sponge rubber or sponge plastic to give a circular cross-section. Pairs of these racks are used together with the stems of the leaves being held between the resilient surfaces, clamping pressure being applied by means of elastic bands 25 or the like which engage the extending ends 26 of the spindles 23′. Adjacent pairs of these racks may be engaged within the side frame members 17 hereinbefore described. Once again when the frames are full, the means are provided to hold these frames within the rack and reference to Figure 3 will show that I have provided resilient springs 27 secured at one end thereof to adjacent the base of side members 17 and having an open eye 28 upon the upper ends thereof which may engage the extending spindles 23′ of the uppermost rack within the frame. Alternatively, of course, resilient means such as rubber bands extend around the base and through notches 4 formed in the upper ends of the side members 17 in Figure 7.

Finally, reference should be made to Figure 8 which shows an alternative construction for the rack members and consists of an elongated board or member 29 covered on both sides with strips of resilient material such as sponge rubber or sponge plastic 30. These may be used in pairs and secured together by elastic bands or the like (not illustrated) thus clamping the stems of the bunches of tobacco leaves between adjacent resilient surfaces. These pairs of racks may then be loaded into a frame such as that illustrated in Figure 2.

From the foregoing, it will be appreciated that rapid loading of bunches of tobacco leaves within curing frames may be undertaken with unskilled labor and without damage occurring to the tobacco product.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A tobacco leaf drying frame comprising in combination a frame including a base and a pair of channelled parallel side members extending from the ends thereof, and a plurality of tobacco leaf carrying racks, means extending from each of said racks selectively engageable within said channelled side members, said frame including a spindle extending from each side of said side members and intermediate the ends thereof for facilitating the movement of the loaded frame, and a further offset transverse member spanning said side members and spaced and parallel from said base, a vertically situated channelled central support member extending from said base between said side members and also being secured to said transverse member, and further means extending from each of said racks selectively engageable within said channeled central support member.

2. The device according to claim 1 in which said racks each comprise a pair of spaced and parallel members, tension springs securing said members together, resilient material covering the outer surfaces of said members and tension means to detachably secure pairs of said members together.

References Cited in the file of this patent

UNITED STATES PATENTS

| | | |
|---|---|---|
| D. 165,799 | Stedman | Jan. 29, 1952 |
| 721,615 | Smith | Feb. 24, 1903 |
| 1,250,959 | Brown | Dec. 25, 1917 |
| 1,643,224 | Shelton | Sept. 20, 1927 |
| 2,614,703 | Molins | Oct. 21, 1952 |